(12) United States Patent
Cameron (10) Patent No.: US 6,471,891 B1
(45) Date of Patent: Oct. 29, 2002

(54) METHOD FOR AUTOMATIC MANUFACTURE OF AND PRINTING ON ASTIGMATIC CONTACT LENSES AND APPARATUS THEREFOR

(75) Inventor: Robert Cameron, Glenview, IL (US)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 09/160,464

(22) Filed: Sep. 24, 1998

Related U.S. Application Data (60) Provisional application No. 60/059,932, filed on Sep. 24, 1997.

(51) Int. Cl.[7] ............................................. B29D 11/00
(52) U.S. Cl. ........................ 264/1.1; 264/2.1; 264/40.5; 264/132; 425/150; 425/808
(58) Field of Search ........................... 264/1.1, 1.7, 2.6, 264/2.1, 2.5, 132, 40.5; 425/808, 150

(56) References Cited

U.S. PATENT DOCUMENTS

| | | |
|---|---|---|
| 3,632,696 A | 1/1972 | Jones |
| 3,946,982 A | 3/1976 | Calkins et al. |
| 4,118,730 A | 10/1978 | Lemelson |
| 4,148,061 A | 4/1979 | Lemelson |
| 4,190,621 A | 2/1980 | Greshes |
| 4,208,365 A | 6/1980 | LeFevre |
| 4,338,626 A | 7/1982 | Lemelson |
| 4,383,672 A | 5/1983 | Kreuttner |
| 4,407,766 A | 10/1983 | Haardt et al. |
| 4,511,918 A | 4/1985 | Lemelson |
| 4,522,768 A | 6/1985 | Roscrow et al. |
| 4,680,998 A | 7/1987 | Council, Jr. |
| 4,693,446 A | 9/1987 | Orlosky |
| 4,749,530 A | 6/1988 | Kunzler |
| 4,874,234 A | 10/1989 | Wichterle |
| 4,969,038 A | 11/1990 | Lemelson |
| 4,979,029 A | 12/1990 | Lemelson |
| 4,984,073 A | 1/1991 | Lemelson |
| 5,023,714 A | 6/1991 | Lemelson |
| 5,067,012 A | 11/1991 | Lemelson |
| 5,110,278 A | 5/1992 | Tait et al. |
| 5,119,190 A | 6/1992 | Lemelson |
| 5,119,205 A | 6/1992 | Lemelson |
| 5,128,753 A | 7/1992 | Lemelson |
| 5,144,421 A | 9/1992 | Lemelson |
| 5,147,585 A | 9/1992 | Blum |
| 5,160,463 A | 11/1992 | Evans et al. |
| 5,200,121 A | 4/1993 | Hagmann et al. |
| 5,249,045 A | 9/1993 | Lemelson |
| 5,252,056 A | 10/1993 | Hörner et al. |
| 5,271,875 A | 12/1993 | Appleton et al. |
| 5,283,641 A | 2/1994 | Lemelson |
| 5,351,078 A | 9/1994 | Lemelson |
| 5,611,970 A | 3/1997 | Apollonio et al. |
| 5,637,265 A * | 6/1997 | Misciagno et al. .......... 264/1.7 |
| 5,916,494 A | 6/1999 | Widman et al. |

FOREIGN PATENT DOCUMENTS

| | | |
|---|---|---|
| EP | 062 178 A1 | 10/1982 |
| FR | 2281584 | 4/1976 |

\* cited by examiner

Primary Examiner—Mathieu D. Vargot
(74) Attorney, Agent, or Firm—R. Scott Meece; Jian S. Zhou; Richard I. Gearhart

(57) ABSTRACT

A method of automatic manufacture of an astigmatic contact lens having a toric portion and a ballast portion such that said ballast portion causes the toric portion of the contact lens to properly orient in the eye of the wearer. The toric lenses are manufactured by moving a pallet containing at least half of a casting cup assembly and an information tag under a filling assembly and filling half of a casting cup assembly with liquid monomer, then moving the pallet to a closing assembly and, based on information obtained from the information tag, rotating one or both halves of the casting cup assembly and closing the casting cup assembly. The liquid monomer is then cured thereby creating a toric contact lens.

40 Claims, 7 Drawing Sheets

METHOD FOR AUTOMATIC MANUFACTURE OF AND PRINTING ON ASTIGMATIC CONTACT LENSES AND APPARATUS THEREFOR

This application is a continuation of provisional U.S. application Ser. No. 60/059,932, filed Sep. 24, 1997.

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

Attached herewith as Microfiche Appendix A is a microfiche of 468 pages of the computer program ladder flow chart of the present invention. The Microfiche Appendix contains 5 frames.

BACKGROUND OF THE INVENTION

Astigmatism is a defect in the eye that is corrected by a lens with a non-spherical prescription. The prescription, which is usually expressed as cylinder on the patient's prescription order, causes at least a portion of the surface of the lens to have the shape of a toric segment. Hence, such lenses are called toric lenses.

While the posterior surface of a contact lens is generally spherical in configuration, where the lens is to used to correct astigmatism it will have a toric configuration. That is, the curved portion of the posterior of the lens has a major and minor axis; the radius of curvature of the posterior surface of the lens being longer in the major-axis direction than in the minor-axis direction. The result is that rather than being of a spherical configuration, the posterior of the lens has a toric configuration with the major axis running orthogonal to the minor axis. The major diameter of the toric curve is generally smaller in diameter than the overall lens, and is cut into a starting base curve which has a spherical configuration.

The corrective lens must be properly oriented with respect to the eye of the wearer. That is, the intended top of the lens must be at the top of the wearer's eye. For ordinary glasses this presents no problem, because the lens is permanently fixed to the frame at the correct rotational orientation. The ear and nose pieces of the frame assure that the frame and the lens do not rotate with respect to the wearer's eyes. For contact lenses orientation is subject to constant alteration. In the case of contact lenses whose function is to correct astigmatism this is unacceptable.

Soft contact lenses which have been designed for use to correct astigmatism are well known in the art. Generally these lenses rely on some type of ballasting method to cause the lens to ride at the proper location on the eye. An ideal lens for correcting astigmatism has good rotational orientation. That is the intended top of the lens should be located at the top of the wearer's eye when the lens is worn. A small amount of deviation from the correct orientation can be tolerated, provided the lens fitter measures the deviation and takes it into account in the lens's prescription.

An ideal lens also provides for good rotational stability. That is, the lens should remain at a fixed rotational orientation within the eye during the entire wearing period. Furthermore, the lens should assume the same orientation each time it is worn. And, of course, the thinner the lens and the smoother the lens surface, the more comfortably the lens will feel to the wearer.

Lenses in accordance with this invention are preferably soft contact lenses, which may be formed of many materials including hydroxyethylmethacrylate, metallo-organic substances, silicone rubbers and various other materials such as described in U.S. Pat. Nos. 3,503,942 and 3,639,524. The preferred soft contact lenses are hydrophilic; that is, they absorb water and, in fact, the water becomes an integral part of their structure. Hydrophilic contact lenses made in accordance with U.S. Pat. No. 4,405,773 are especially preferred for practicing this invention.

Although contact lenses used for the correction of astigmatism have been around for some time, the costs to manufacture these lenses have not decreased over time. The cost has remained high due to the small number of lenses that are manufactured which is due, in part, to the many different number of lenses needed. For example, if toric lenses are rotationally configured for ballast variations of ten degrees, 36 different lenses may have to be manufactured to take into account the total number of lenses possible for each prescription. This is in contrast to one configuration needed for a non-toric lens. Further, since there are fewer astigmatic prescriptions than regular non-toric prescriptions, the number of toric lenses is even less than the 36-to-1 ratio disputed above.

SUMMARY OF THE INVENTION

The invention described herein provides a method of automatically manufacturing toric contact lenses which will greatly reduce the associated costs. By providing a precision, programmable, rotational alignment between the casting cups, toric lenses may be manufactured at similar speeds as non-toric lenses whereby a change in the toric prescription affords no down time of the manufacturing process. The automatic filling and closing machine obtains information about the toric lenses to be manufactured from the pallet containing the casting cups. After the information is communicated to the filling and closing machine, the programmable controller activates the filler and closer machine which then operates to manufacture a particular toric lens having a precise toric rotational alignment. Once a particular number of lenses are manufactured, the programmable controller will obtain new information from the next pallet tag and operate to rotate the casting cup assembly to a new rotational alignment thereby manufacturing toric lenses with a different toric rotational alignment. This process allows the manufacture of multiple toric lenses with different rotational alignments in the same or similar time it would take to make the same number of contact lenses with the same toric rotational alignment. Smaller batches of toric lenses can be manufactured in the same time it takes to manufacture a large batch of the same toric lenses.

It is an object of this invention to provide an apparatus that can accurately fill a molded casting cup with liquid monomer and reassemble the casting cup halves, i.e., front curve and base curve, under a precisely controlled motion while maintaining precision, programmable, rotational alignment between the casting cup halves.

It is another object of this invention to provide a method of manufacturing astigmatic or toric contact lenses by filling one-half of a molded contact lens casting cup with liquid monomer, and, using a programmable precision filling and closing apparatus, programmed such that the other half of the casting cup assembly is rotatably aligned close to the other half thereby manufacturing a toric contact lens.

It is another object of this invention to provide a method of automatically changing the rotational alignment of the casting cup assembly whereby a new prescription toric lens may be manufactured with zero loss down time or changeover time.

It is another object of this invention to provide a fully-automated printing system to accurately print axis orientation feature on the front of the contact lens such printing thereby aiding in the proper fitting and stability of the toric contact lens on the wearer's eye.

It is another object of this invention to provide a method of automatically printing an accurate axis orientation feature on a toric lens by inserting a pallet containing toric contact lenses via a conveyor into the printing zone. Then using encoded information, the automatic printing apparatus applied the axis orientation mark to a silicone print pad, the location of the mark determined by the encoded information. Then, the contact lens is held in position so that the axis orientation feature or iris print can be applied. Finally, the casting cup is located for a video inspection, thereby verifying the location of the axis orientation feature on the casting cup.

These and other important features and advantages of the invention will become apparent when viewing the drawings and when described in the detailed embodiment of the invention below.

DETAILED DESCRIPTION OF AN EMBODIMENT OF THE INVENTION

Figure 1:
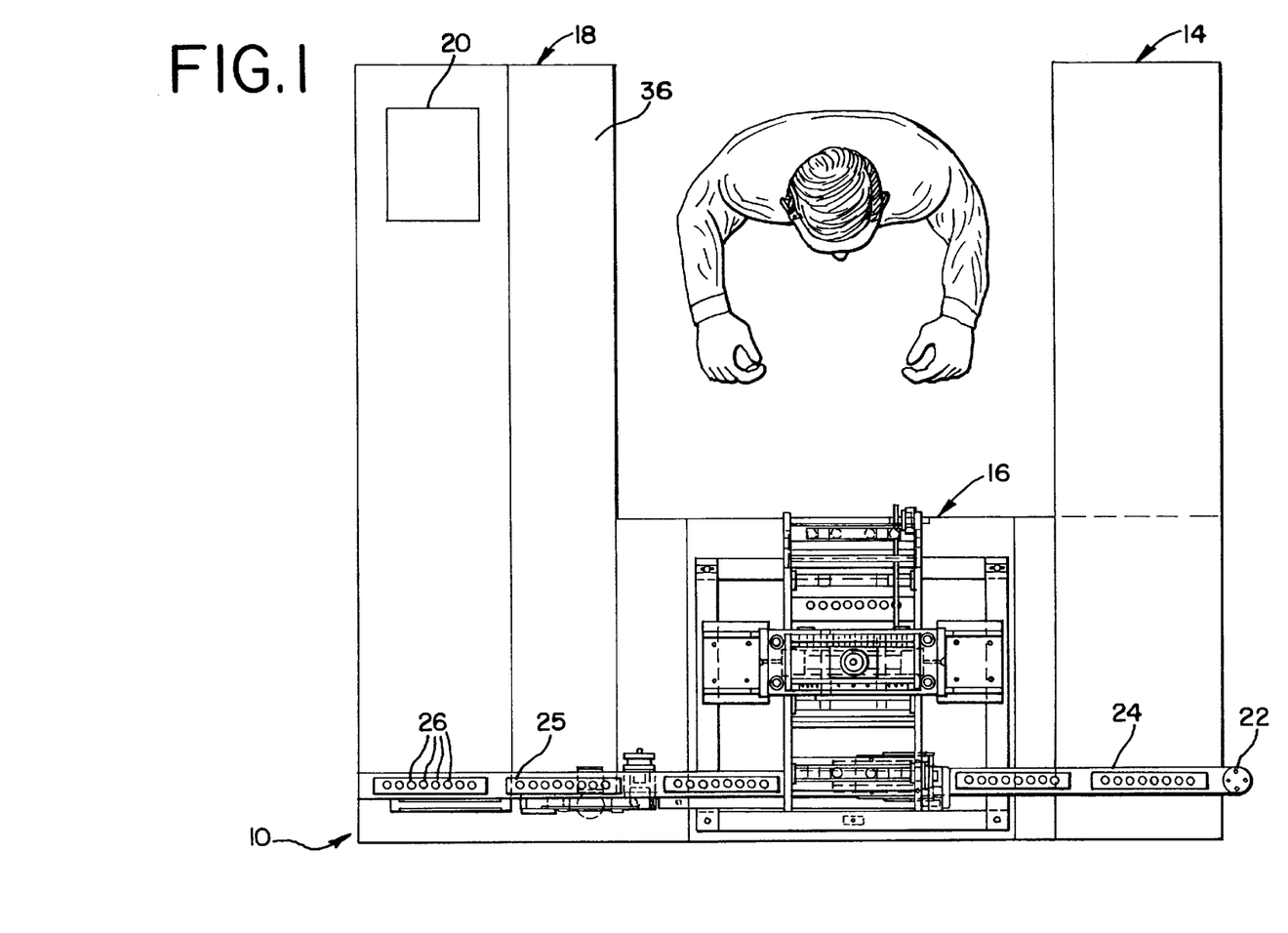
FIG. 1 illustrates a top view of the filling and closing machine in accordance with the present invention.

FIG. 1 shows a top view of the apparatus of the present invention for automatically manufacturing astigmatic or toric contact lenses and printing thereon. The automatic filling and closing machine 10 is made up of the pallet infeed conveyor assembly 14, the toric filler and closer box unit assembly 16, the pallet unload assembly 18, and the programmable controller 20.

Traversing across the dummy infeed conveyor and the pallet infeed conveyor 14 the toric filler and closer base unit assembly 16 and the pallet unload assembly 18 is the pallet conveyor 22. The pallet conveyor moves each pallet 24 from the pallet infeed conveyor 14 to the toric filler and closer base unit assembly 16 for processing and then sends the cure pallet 25 containing the filled casting cup assembly 26 to the pallet unload assembly 18 for further processing. Each pallet 24 contains multiple casting cup assemblies 26, preferably eight which are used to manufacture the toric lenses.

Figure 2:
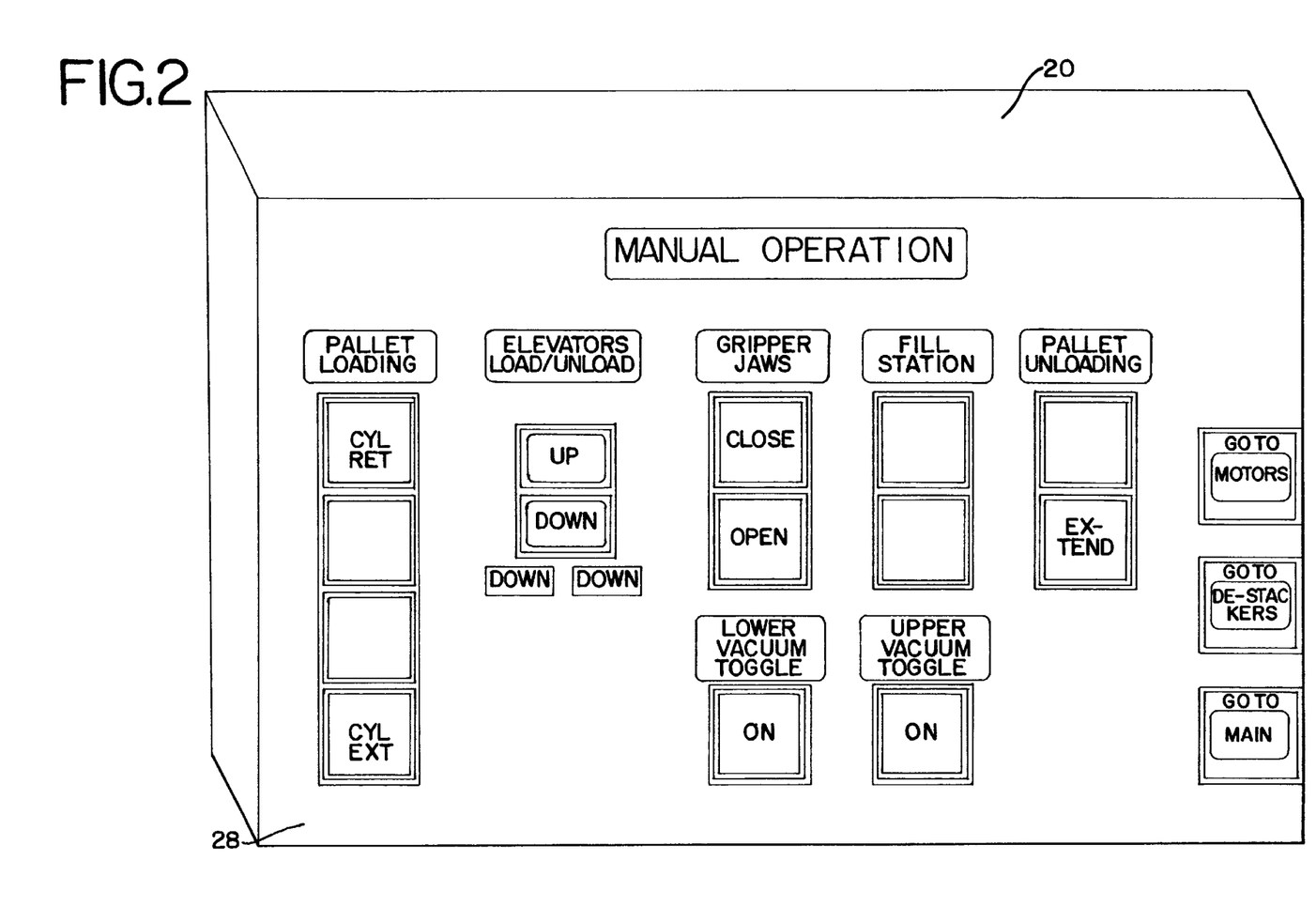
FIG. 2 illustrates a display portion of a programmable controller in accordance with the present invention.

The programmable controller 20 is located away from the machine 10 thereby allowing maximum accessibility to the production zone by the operator 30. The programmable controller 20 may be one of a number of commercially available controllers, preferably the Allen-Bradley, SLC500 programmable controller using Rockwell Software RSLogix 500 software. The software used to control the filling and closing matching 10 is a ladder-type software protocol. Flow charts for the filling and closing machine and the printing machine are disclosed in Appendix A. The programmable controller 20 uses a touch screen display 28 for input and output of data. The touch screen display 28 is also used in manual operation of the filling and closing machine 10 as shown in FIG. 2. As described below in the automatic filling and closing mode, the proper toric rotational setting is controlled by the programmable controller 20 based on information received by the controller 20 from an information tag 27 (see FIG. 7) attached to the pallet 24. A preferable type of information tag 27 is the inductive tag manufactured by Pepperl-Fuchs along with the Pepperl-Fuchs reader. Other types of information tags may be used such as bar code systems, other readable media and touch memories.

Figure 3:
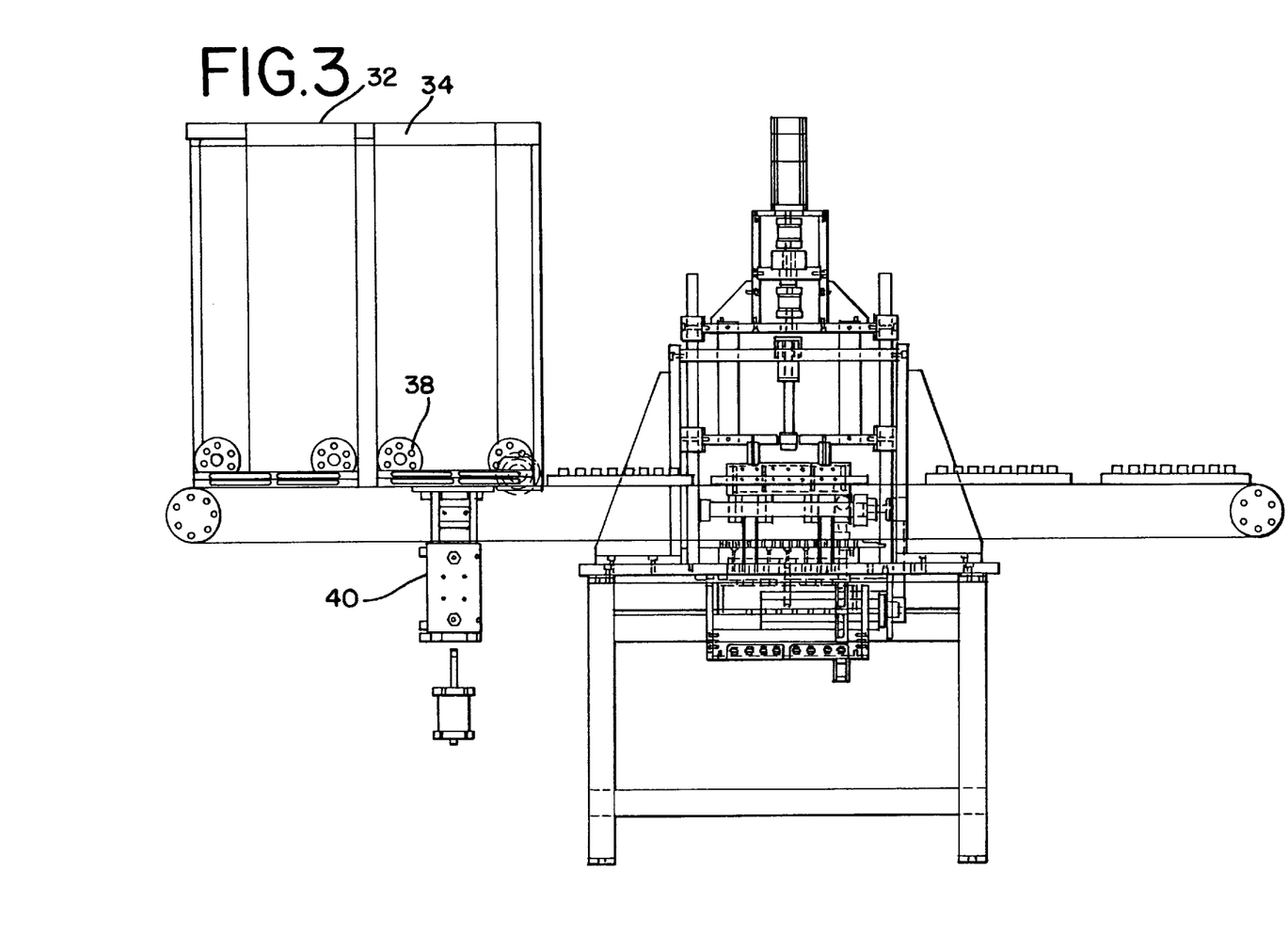
FIG. 3 illustrates a side view of the filling and closing machine.

The pallet unload assembly 18 is made up of first destacker 32 and second destacker 34, and the pallet unload conveyor 36 as seen in FIG. 1 and FIG. 3. The pallet unload assembly 18 also.utilizes four shot pins 38 and two pneumatic lifts 40. After the filling and closing process is complete, the processed pallet is delivered via conveyor 22 to the pallet unload conveyor 36 for curing.

Figure 4:
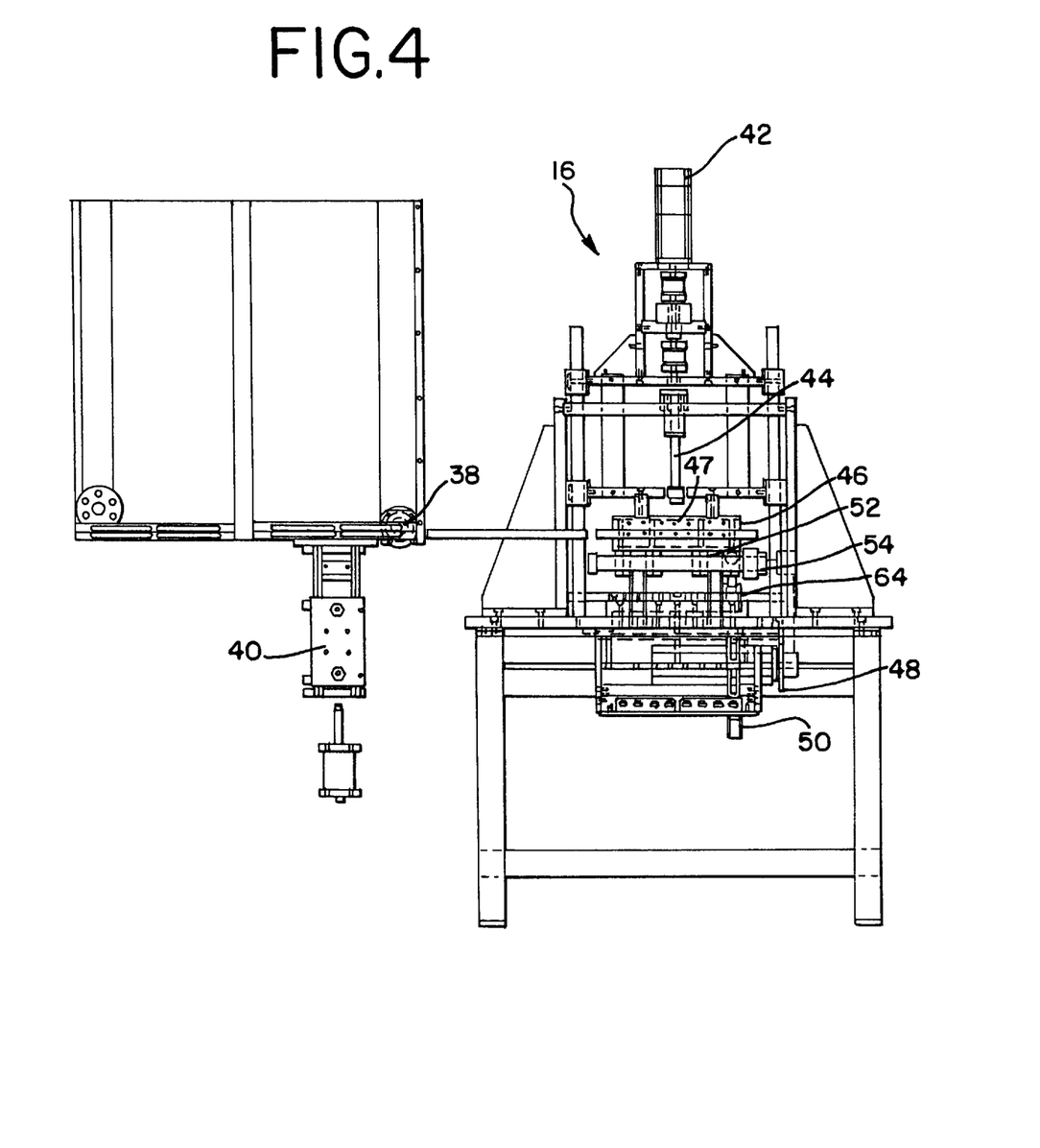
FIG. 4 illustrates a front view of the filling and closing machine accordance with the present invention.

FIG. 4 shows a front view of the filler and closer base unit assembly 16. The base unit assembly 16 contains, among other things, a pick and place closure motor 42, a lead screw 44, and an upper closure head 46 containing gripper jaws 47. The motor 42 used in conjunction with the lead screw 44 lifts and lowers the upper closure head or pick and place head 46 and opens and closes the gripper jaws 47. Also located on the filler and closer base unit assembly 16 is an indexing conveyor servo 48 and a rotary drive stepper motor and controller 50. The filler and closer base unit assembly 16 also utilizes a lot tracking read zone 52 and a lot tracking write zone 54.

The automatic filling and closing machine 10 is used to manufacture astigmatic contact lenses in accordance with the present invention as described below and in reference to FIGS. 1, 3 and 4.

The object of the filling and closing machine 10 is to accurately fill a molded casting cup 26, preferably a front curve-concave casting cup, with liquid monomer and reassemble the casting cup halves, the front curve-concave and the base curve-convex, under a precisely controlled motion while maintaining precision, programmable, rotational alignment between the casting cup halves.

To accomplish this process a pallet or multiple pallets 24 are loaded onto the filling and closing machine 10. Once the controller 20 senses that there are pallets 24 in the correct position on the pallet infeed conveyor 14, the pallet 24 is shuttled into position on the conveyor 22. At the same time the cure pallets 25 have been stacked on one of the destackers 32, 34. A linear actuator, preferably a Barrington Automation linear actuator, will go to its full top stroke meaning that all of the pallets are in the stack and are locked with the shot pin 38. The entire stack is lifted, preferably 30 thousandths of an inch, using the pneumatic lift 40, the pins 38 are then released. The mid-stroke cylinders are fired, they stroke out all the way and the linear actuator will drop. Since the bottom cylinder is stronger than the linear actuator the actuator will be stuck in mid stroke. The entire stack will lower, preferably ¾ of an inch, or the thickness of the pallet. Now the shot pins 38 are fired thereby locking the entire stack but allowing the single cure pallet 25 to break away from the stack. The mid-stroke cylinder and linear actuator are retracted all the way which brings the pallet down to a track so that it can be utilized in the process.

Figure 9:
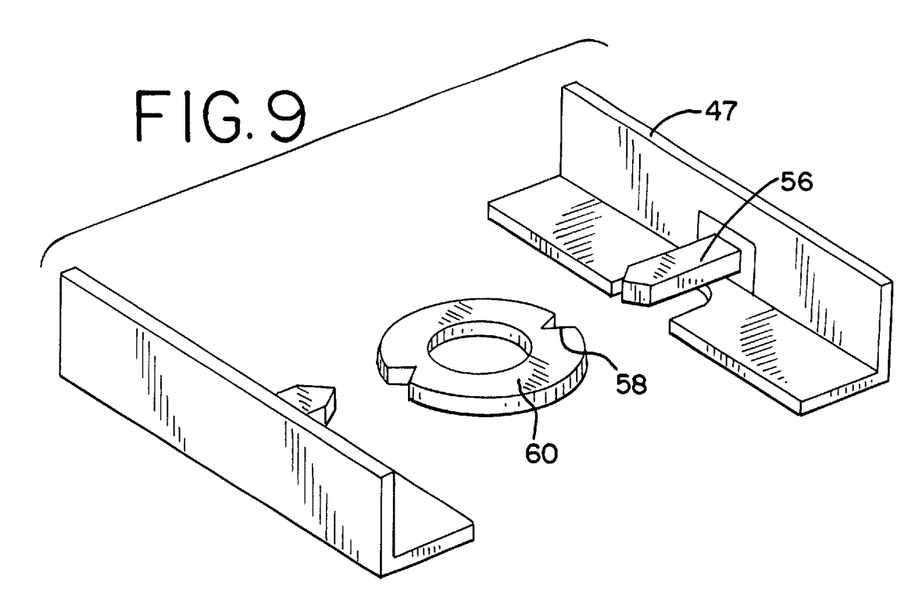
FIG. 9 illustrates the gripper jaws and casting cup flange used in accordance with the present invention.

Now that the pallet 24 and the cure pallet 25 are ready for use, the close station can be addressed. As the pallet 24 travels along the conveyor 22, it arrives at the filler, preferably an Oyster Bay pump unit. A signal is sent to the pump unit which operates to fill the front curve cup with monomer. The pallet 24 is then located along the conveyor 22 underneath the pick and place head 46. The controller 20 actuates the servo 42, lowering the closure head 46 and closing the jaws 47. The jaws 47 grab the front curve casting cups out of the pallet 24. To effect the grasping by the jaws 47, the jaws 47 contain a V-shaped pin 56 in them. The front curve casting cup flange 60 has female V-notches 58 in them. The V-shaped pins 56 are intended to accurately grasp the flange 60 with no slop or clearance.

With a vertical motion, the jaws 47 strip the front curve casting cup from the holes of the pallet 24. The pallet 24 has special C clips 62 which hold the cups in place allowing only minimal rotation for compliance with the gripper pin set 47 while maintaining angular orientation through the processing.

Next, the gripper jaws 47 place the prefilled front curve casting cups into the lower closure heads 64 (the front curve casting cup does not necessarily need to be prefilled). The lower closure heads have alignment pins, which locate the casting cup flange V-notch 58 accurately in the lower closure heads 64. The cups are held at the V-notches, while placing the V-notch over the locating pins of the lower closure head. The jaws 47 are built to comply with this requirement.

Figure 7:
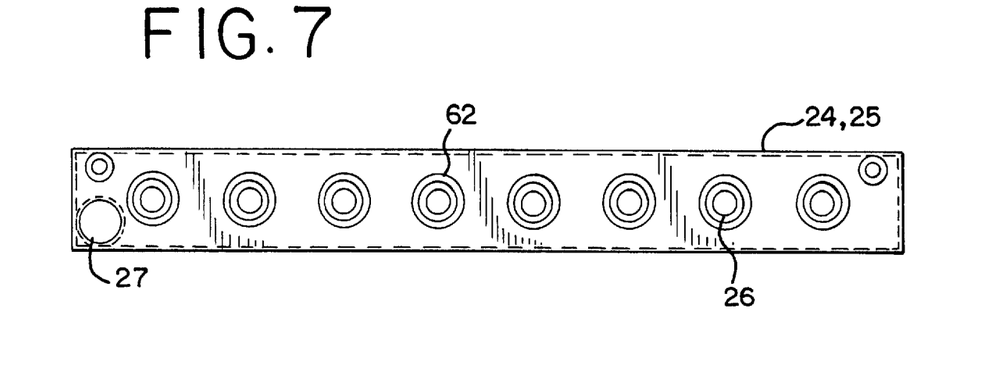
FIG. 7 illustrates a top view of a pallet used in accordance with the present invention.
Figure 8A:
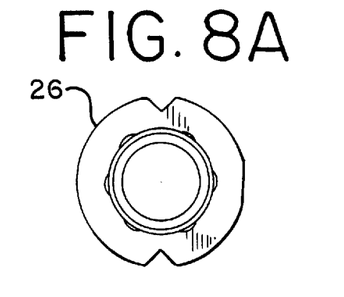
FIGS. 8A and 8B illustrate a top and side view of a casting cup used in accordance with the present invention.
Figure 8B:
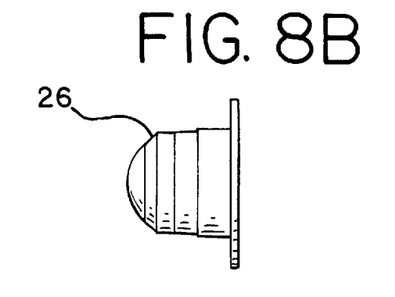

The pallet 24 is affixed with an inductive tag 27 that communicates information to the programmable controller 20. The information communicated to the controller 20 via the Pepperl-Fuchs reader allows the controller 20 to configure the filling and closing machine 10 such that a particular toric lens will be manufactured. Depending on the information communicated the lower closure heads 64 rotate to the proper toric rotational axis setting. Although the machine 10 may hold the lower heads 64 still and rotate the upper heads 46, rotating the lower heads 64 is preferred. The rotation is accomplished by a stepper motor 50 which has an integral encoder for positive position feedback.

The base curve cup is shuttled under the pick and place head 46 and is grasped by the male V-notch gripper jaws 47 and stripped from the pallet 24. The base curve cup is not rotated, since the front curve cup is already at the proper axis setting. The C clips 62 in the pallets perform two functions. They allow only minimal rotation of the cups to comply with the gripper jaws 47 for alignment, also provide a tight fit of the cups in the pallets 24 to keep them sitting flat and flush while being jostled through the fast moving processing steps.

Next, the jaws 47 close the cup set with a servo-driven, programmable downward motion. This downward motion lifts a cantilevered weight which regulates the closing force. Then the excess monomer is evacuated from the cup cavity thereby completing the closing process. The pick and place head 46 is raised, pulling the cup assembly up. The lower heads 64 rotate back to their zero position and await the next cycle.

The nested conveyor 22 next shuttles the cure pallet 25 under the pick and place head 46 and the cup assembly is placed in the cure pallet 25. The cure pallet 25 also has C clips 62 to control the cups location in the pallet. The cure pallet 25 is then placed onto the conveyor 22 for further processing and the pallet 24 returns to the pallet 24 processing location.

Once the toric lens has been cured and the casting cup halves are separated it is ready for printing. The printing process is described below and in reference to FIGS. 5 and 6.

Figure 5:
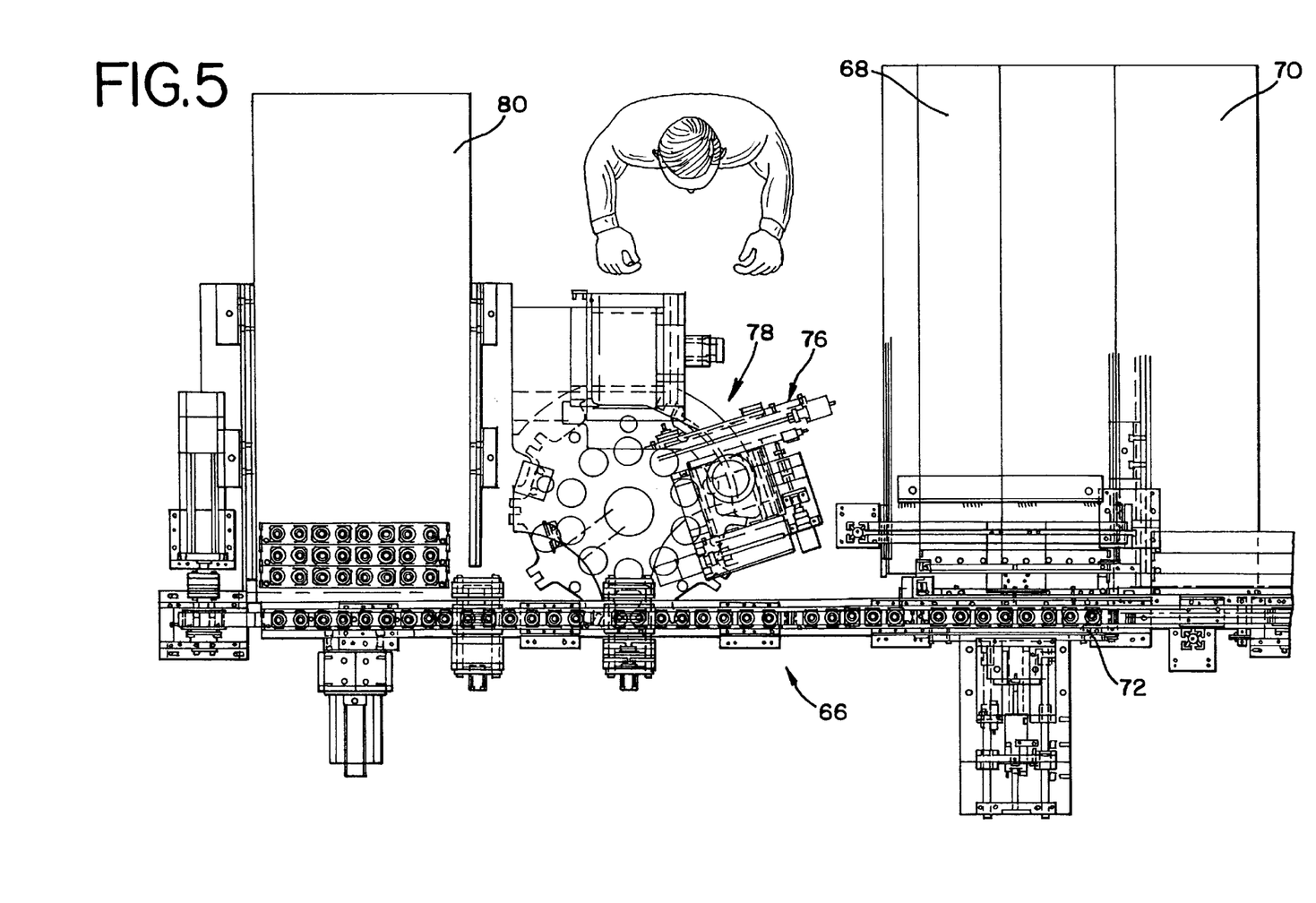
FIG. 5 illustrates a top view of the printing machine in accordance with the present invention.
Figure 6:
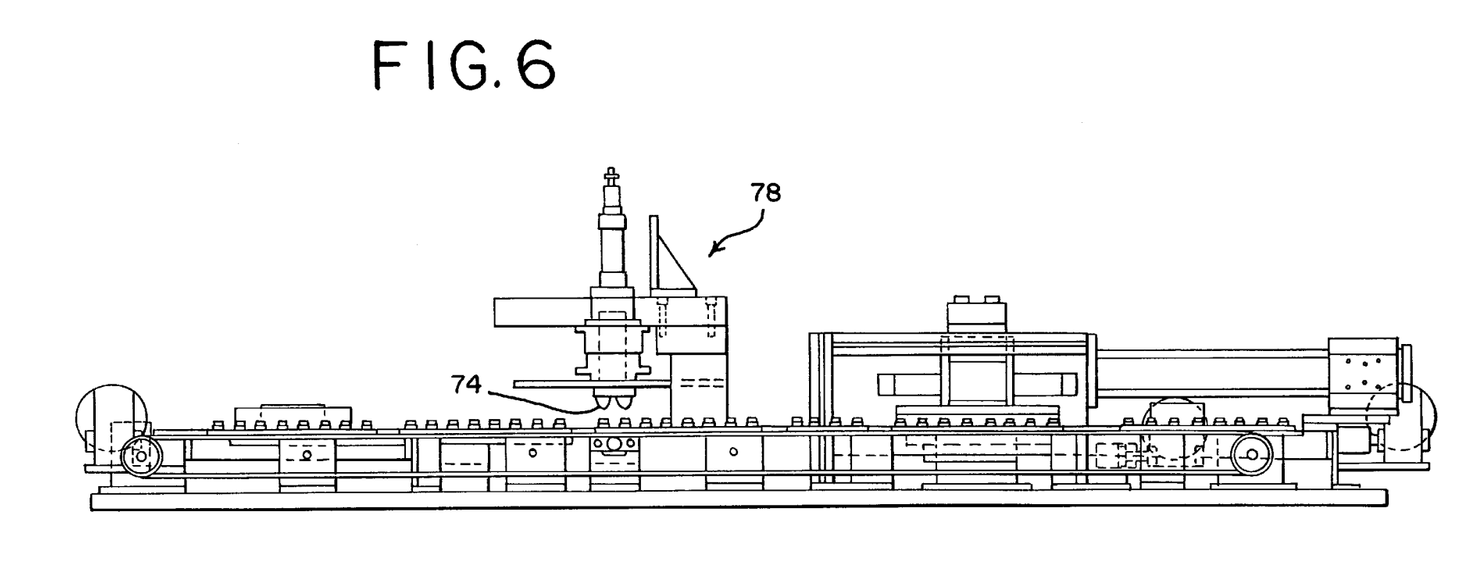
FIG. 6 illustrates a side view of the printing machine in accordance with the present invention.

The printing process utilizes a fully-automated printing machine 66. The purpose of this machine is to accurately print an axis orientation feature on the front of the contact lens. This aides the doctor in judging proper fit and stability of the lens on the patient's eye.

The printing machine 66 works in conjunction with a pallet design that holds the casting cup half (containing the cured contact lens) by using a press fit procedure. The casting cup is press fit over a base curve configuration on the pallet which has an outside diameter approximately 0.0005 to 0.001 inches larger than that of the inside diameter of the base curve casting cup. Once the casting cup is placed onto the pallet containing the slightly larger diameter, the base curve casting cup will not move an appreciable amount and the lens may then be printed on as described below.

The printing machine 66 can also utilizes a pallet design which has a C-clip 62 similar to the description in the filler and closer machine 10. The purpose of the C-clip 62 is to affix and allow only minimal rotation of the base curve casting cup on the pallet. During the time the base curve cup is inserted onto the print pallet, this print pallet C-clip 62 will be aligned to the midpoint of its angular rotation with a shotpin. This alignment is necessary to ensure that the cup can comply to the V-notched gripper jaws 47 which accurately locates the casting cup 26 during printing.

The printer infeed conveyor 68 accepts product pallets 25 coming from the pre-print drying oven and accumulates pallets for processing. Alongside the infeed accumulation conveyor 68 is a second conveyor or dummy infeed conveyor 70 which allows pallets and empty casting cups, without lenses, to be printed. This second conveyor 70 is used to test the location accuracy of the orientation feature without wasting product. Both of these rows of pallets 25 have an inductive or information tag 27 to transfer the lot information and axis setting to the printer controller 20.

Either one of the pallet 25 rows (whichever is being used) will be pushed onto a servo-driven, nested, indexing conveyor 72 to bring the casting cups into the printing zone 78. The indexing conveyor system 72 can be programmed to move pallets 25 through the system differently to adapt to various preferred production scenarios such as speeding up the last pallet out of the system for lot cleanout.

Before the axis orientation mark can be placed on the lens, the mark must be applied to the silicone print pad 74. This is accurately accomplished with an ink delivery system, mounted on top of a motorized X, Y, & THETA positioning system 76. The three axes are driven by stepper motors with integral encoders connected to pre-loaded anti-backslash lead screws capstan design. The slides and rotary bearings are an anti-friction, pre-loaded design to assure maximum accuracy and repeatability to minimize the product's standard deviation.

The rotary cliche station also has a manually-adjusted X&Y dovetail stage on the top of the radius bearing. This stage properly aligns the etched axis orientation mark over the radius bearing. There is also a crosshair etched into the cliche at a precise location from the axis orientation feature, allowing the pre-alignment of the cliché. By adjusting the manual X&Y dovetail slides to align the crosshair on the cliche plate with the crosshair in a short-range telescope or fiber-optic camera and monitor setup, one can pre-align the cliche. Once properly adjusted, the cliche station can be rotated to a new axis orientation setting for each lot without having to adjust X&Y. This will increase efficiency and printing accuracy to maximize yield.

There are two cup locator stations. The first station locates and holds the casting cup to have the axis orientation feature or iris printpapplied. Since the front curve casting cup half is rotatably aligned during the fitting and closing stage, the axis orientation is rotated at printing to match the filing and closing rotational alignment. The second station locates the casting cup for use with a video inspection station. The inspection station will verify the location of the axis orientation feature on the casting cup. This system will also use the information to dynamically adjust the X, Y, and THETA positions, if required, on the motorized rotary cliche station. The system allows for self-correction and enables reliable production without the constant attention of an operator.

Both locating stations have male V-notches which grasp the casting cup on the female V-notch 58 of the flange 60. The pallets 25 are then pushed off the nested, indexing conveyor 72 onto the unload conveyor 80 which allows for any additional processing.

While the invention has been described in connection with a preferred embodiment, it is not intended to limit the invention to the particular embodiment set forth, but, on the contrary, it is intended to cover such alternatives, modifications, and equivalents as may be included within the sirit and scope of the invention as defined by the appended claims.

What is claimed is:

1. A method of manufacturing an astigmatic contact lens, comprising the steps of:
    a) placing a pallet containing a first half toric lens casting cup and an information tag onto a conveyor;
    b) locating the pallet under a filling assembly;
    c) filling said first half toric lens casting cup with liquid monomer;
    d) locating said pallet into a closing assembly;
    e) communicating information from said information tag to a programmable controller;
    f) rotating a second half toric lens casting cup based on the information communicated to the programmable controller;
    g) closing said second half toric lens casting cup into said first half toric lens casting cup, thereby making a closing cup assembly;
    h) moving said pallet away from said closing cup assembly; and
    i) curing said liquid monomer.

2. The method of manufacturing in claim 1, wherein said information tag is an inductive tag.

3. The method of manufacturing in claim 1, wherein said information tag is a bar code tag.

4. The method of manufacturing in claim 1, wherein said first half toric lens casting cup is a base curve toric lens casting cup and said second half toric lens casting cup is a front curve toric lens casting cup.

5. The method of manufacturing in claim 1, wherein said first half toric lens casting cup is a front curve toric lens casting cup and said second half toric lens casting cup is a base curve toric lens casting cup.

6. The method of manufacturing in claim 1, wherein said filling of said first casting cup occurs after closing said second half toric lens casting cup into said first half toric lens casting cup.

7. The method of manufacturing in claim 1, wherein said closing said second half toric lens casting cup into said first half toric lens casting cup is accomplished using a C clip, and a V-notch gripper jaws.

8. The method of manufacturing in claim 7, wherein said closing said second half toric lens casting cup into said first half toric lens casting cup is accomplished further using a cantilever weight.

9. A method for manufacturing toric contact lenses, comprising the steps of:
    (a) providing a plurality ofcontact lens molds, each having ai front curve casting cup and a base curve casting cup;
    (b) defining a plurality of rotational orientations between said front and base curve casting cups of a mold, each rotational orientation corresponding to an astigmatism-correcting characteristics of a toric contact lens;
    (c) providing on a pallet one of a plurality of machine readable codes, each machine readable code specifying one of the rotational orientation,,;
    (d) placing one or more contact lens molds or casting cups thereof in said pallet;
    (e) automatically reading the machine readable code on said pallet;
    (f) automatically adjusting the rotational orientation of said front and base curve casting cups for said one or more molds to the particular rotational orientation defined by said machine readable code; and
    (g) molding one or more toric contact lenses with the front and base curve casting cups engaged in said particular rotational orientation, the lenses having a desired astigmatism-correcting characteristic corresponding to a particular rotational orientation defined by said machine readable code.

10. A method of claim 9, further comprising the step of repeating steps (c)–(e) as required to produce desired quantities of toric contact lenses with the desired astigmatism-correcting characteristics.

11. The method of claim 10, wherein said step (b) of defining includes the step of storing in a memory codes corresponding to the rotational orientations.

12. A method for manufacturing a contact lens, comprising the steps of:
    providing a contact lens mold having a plurality of pieces and forming a mold cavity for a toric contact lens with a front curve casting cup and a base curve casting cup;
    defining a selected rotational orientation for at least one of said casting cups, wherein the selected rotational orientation corresponds to a desired astigmatism-correcting characteristics of a toric contact lens;
    providing on a carrier a machine readable code which specifies the selected rotational orientation of the at least one casting cup required to produce the toric contact lens with the desired astigmatism-correcting characteristic;
    placing at least one of the casting cups of the contact lens mold in said carrier;
    automatically adjusting the orientation of said at least one casting cup to the selected rotational orientation;
    performing a manufacturing operation with said at least one casting cup positioned at the selected rotational orientation; and producing the contact lens having at least the desired astigmatism-correcting characteristics.

13. The method of claim 12, wherein said step of defining includes the step of storing in a memory codes corresponding to one or more rotational orientations of at least one of said casting cups.

14. The method of claim 12, wherein said step of automatically adjusting includes the steps of:
filling one of the cups of the mold with a lens forming liquid;
automatically reading said code; and
rotating at least one of the cups of the mold to a rotational position defined by said code.

15. The method of claim 14, wherein said step of performing includes the steps of:
engaging the front and base curve casting cups of the mold;
forming a mold cavity with the lens forming liquid contained therein; and
maintaining the rotational position specified for at least one of the casting cups of the mold.

16. The method of claim 15, wherein said step of producing includes the step of forming a contact lens in the mold cavity with the astigmatism-correcting characteristics determined by the specified rotational position of at least one of the cups of the mold.

17. The method of claim 12, wherein said step of performing includes the step of printing an axis orientation mark on a contact lens carried on at least one of said pieces, the mark being the desired astigmatism-correcting characteristics of said contact lens.

18. The method of claim 17, wherein said step of printing includes the step of orienting a printing element at said selected rotational orientation in relation to a contact lens carried on said at least one of said pieces.

19. A system for automatically manufacturing toric contact lenses comprising:
a plurality of contact lens molds, each mold having a front curve casting cup and a base curve casting cup;
a carrier for the front or base curve casting cups of said plurality of molds;
a machine readable code carried on said carrier, the code defining a rotational orientation of the cups of the carrier required to form a toric contact lens having a corresponding astigmatism-correcting optical characteristic;
means for reading said code and automatically rotating the casting cups of the carrier to the corresponding rotational orientation; and
means for forming toric contact lenses in said molds with the cups held in the defined rotational orientation and providing an astigmatism-correcting optical characteristic of the lenses.

20. A method for manufacturing an astigmatic iontact lens having a desired toric rotational axis, said method comprising the steps of:
providing a contact lens mold, said mold including a first mold half and a second mold half;
placing a tag on a pallet capable of carrying a plurality of contact lens molds, said tag providing information corresponding to a desired toric rotational axis of an astigmatic contact lens to be manufactured;
placing the contact lens mold on a pallet;
communicating to a programmable controller the information;
rotating one of said first and second halves to the desired toric rotational axis communicated to the programmable controller;
filling one of said first and second halves with a predetermined amount of liquid monomer;
assembling said first and second mold halves to define a contact lens mold cavity therebetween having a rotational alignment corresponding to the desired toric rotational axis;
maintaining the rotational alignment between the mold halves; and
curing said liquid monomer in said mold cavity to form the astigmatic contact lens having the desired toric rotational axis.

21. The method of claim 20 wherein the first mold half includes a contact lens front curve forming surface, and the second mold half includes a contact lens base curve.

22. The method of claim 20 wherein the step of rotating is automatically controlled by said programmable controller.

23. The method of claim 22 further comprising inputting the information into said programmable controller through use of touch screen display in communication with the programmable controller.

24. The method of claim 20 wherein the first mold half includes opposing V-notches on the mold flange, and said step of rotating includes engaging the V-notches with alignment pins on a rotatable head.

25. The method of claim 20 further comprising locating said first mold half on a rotatable head at a zero position, rotating said head to a rotational alignment corresponding to the desired toric rotational axis, removing the assembled mold halves from the rotatable head, and rotating the rotatable head back to the zero position.

26. The method of claim 20 wherein the step of communicating is performed once for the manufacture of a plurality of contact lenses, and for the plurality of contact lenses manufactured, one of the first and second mold halves is rotated to the desired toric rotational axis until new information corresponding to a new desired rotational axis is communicated to the programmable controller.

27. The method of claim 26 further comprising communicating to the programmable controller new information corresponding to a new desired toric rotational axis, and carrying out the step of rotating one of the first and second mold halves to the new desired toric rotational axis.

28. The method of claim 20 wherein the step of rotating includes rotating said first mold half, and the step of filling includes filling said first mold half.

29. The method of claim 20 further comprising applying an axis orientation mark onto a silicone print pad, rotating said silicone print pad to the desired rotational axis communicated to the programmable controller, and transferring said axis orientation mark from the print pad onto the contact lens.

30. The method of any of claims 1–8, 9, 10, 11, 12–13, 14–16, 20–23, and 24–28, further comprising applying an iris print to at least one contact lens.

31. A process for manufacturing from moldable material a plurality of toric contact lenses having a desired astigmatism-correcting characteristic, each lens having a front curve and a base curve, the process comprising the steps of:
(a) providing an information tag on a mold holder having a plurality of toric contact lens molds containing moldable material, each mold comprising a front curve casting surface and a base curve casting surface, said information tag containing information specifying a particular rotational orientation of the front curve casting surface with respect to the base curve casting surface of each mold in the mold holder, the particular rotational orientation corresponding to the desired astigmatism-correcting characteristic of the tc)ric contact lens;

(b) automatically adjusting the rotational orientation of the front curve casting surface with respect to the base curve casting surface to the particular rotational orientation defined by said information tag;

(c) causing the moldable material in the molds to form toric contact lenses, each lens having the desired astigmatism-correcting characteristics.

32. The process of claim 31 wherein the information tag carried by the mold holder comprises a machine readable code.

33. The process of claim 31, wherein the step (b) comprises rotating at least a portion of each of the molds in accordance with the information contained in the information tag.

34. The process of claim 33 wherein the at least a portion of each of the molds to be rotated is removed from the mold holder, rotated, and replaced in the same mold holder or in a different mold holder carrying an identical information tag associated with the desired astigmatism-correcting characteristics.

35. The process of claim 34 wherein the information contained in the information tag carried by the same mold holder or different mold holder comprises machine readable code.

36. The process of claim 31 further comprising repeating steps (a) and (c) for a different desired astigmatism-correcting characteristics.

37. The process of claim 31 further comprising applying an axis orientation mark to at least one contact lens.

38. The process of claim 37 further comprising repeating steps (a) and (c) for a different desired astigmatism-correcting characteristics.

39. The process of claim 31 further comprising applying an iris print to at least one contact lens.

40. The process of claim 39 further comprising repeating steps (a) and (c) for a different desired astigmatism-correcting characteristics.

* * * * *